United States Patent
Mese et al.

(10) Patent No.: US 10,796,693 B2
(45) Date of Patent: Oct. 6, 2020

(54) MODIFYING INPUT BASED ON DETERMINED CHARACTERISTICS

(71) Applicant: Lenovo (Singapore) Pte. Ltd., Singapore (SG)

(72) Inventors: John Carl Mese, Cary, NC (US); Arnold S. Weksler, Raleigh, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/964,242

(22) Filed: Dec. 9, 2015

(65) Prior Publication Data

US 2017/0169819 A1   Jun. 15, 2017

(51) Int. Cl.
*G10L 15/22*   (2006.01)
*G10L 17/06*   (2013.01)
*G06F 3/16*   (2006.01)

(52) U.S. Cl.
CPC .............. *G10L 15/22* (2013.01); *G06F 3/167* (2013.01); *G10L 17/06* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 2006/0265217 A1* | 11/2006 | Bicego | G10L 15/22 704/231 |
| 2011/0144999 A1* | 6/2011 | Jang | G06K 9/00892 704/270.1 |
| 2013/0124207 A1* | 5/2013 | Sarin | G10L 15/22 704/275 |
| 2014/0108013 A1* | 4/2014 | Di Cristo | G06F 17/273 704/254 |
| 2014/0343950 A1* | 11/2014 | Simpson | G06F 3/167 704/275 |
| 2015/0019217 A1* | 1/2015 | Di Cristo | G06F 17/279 704/235 |
| 2015/0073910 A1* | 3/2015 | Kennewick | G06Q 30/0261 705/14.58 |
| 2015/0120294 A1* | 4/2015 | Gardner | G10L 15/22 704/235 |
| 2015/0169336 A1* | 6/2015 | Harper | G10L 15/22 715/706 |
| 2015/0228279 A1* | 8/2015 | Biadsy | G10L 15/26 704/235 |
| 2015/0254062 A1* | 9/2015 | Kim | G06F 3/01 345/156 |
| 2015/0256873 A1* | 9/2015 | Klein | H04N 21/26283 725/39 |

(Continued)

*Primary Examiner* — Douglas Godbold
(74) *Attorney, Agent, or Firm* — Ference & Associates LLC

(57) ABSTRACT

One embodiment provides a method, including: receiving, at a device, input; processing, using a processor, the input to identify at least one user command; identifying, using a processor, a characteristic related to the at least one user command; and performing an action based on the at least one command and the characteristic. Other aspects are described and claimed.

20 Claims, 3 Drawing Sheets

(56) References Cited

U.S. PATENT DOCUMENTS

| | | | |
|---|---|---|---|
| 2015/0340033 A1* | 11/2015 | Di Fabbrizio | G10L 15/18 704/254 |
| 2015/0348551 A1* | 12/2015 | Gruber | G06F 17/2705 704/235 |
| 2016/0005404 A1* | 1/2016 | Yokoya | H04N 21/233 704/275 |
| 2016/0035346 A1* | 2/2016 | Chengalvarayan | G10L 15/07 704/246 |
| 2016/0132342 A1* | 5/2016 | Yang | G06F 3/04883 715/708 |
| 2017/0116986 A1* | 4/2017 | Weng | G10L 15/22 |
| 2019/0196781 A1* | 6/2019 | Yang | G06F 3/167 |

* cited by examiner

US 10,796,693 B2

MODIFYING INPUT BASED ON DETERMINED CHARACTERISTICS

BACKGROUND

With the creation of intelligent digital personal assistants, (e.g., SIRI, S Voice, GOOGLE NOW, CORTANA, etc.) the use of voice commands to control electronic devices has become extremely popular. Generally, a user interacts with a voice input module, for example embodied in a personal assistant through use of natural language. This style of interface allows a device to receive voice inputs such as voice commands from a user (e.g., "What is the weather tomorrow"), process those requests, and perform a user's desired action(s) by carrying out the task or delegating user requests to a desired application. SIRI is a registered trademark of Apple Inc. in the United States and other countries. S VOICE is a registered trademark of Samsung Electronics Co. in the United States and other countries. GOOGLE is a registered trademark of Google Inc. in the United States and other countries. CORTANA is an unregistered trademark of Microsoft in the United States and other countries.

Because natural language is a method of communication people are typically comfortable with, the ability to use voice commands offers a natural and efficient way to utilize functions of a device's operating system or applications, no matter how simple or complex.

BRIEF SUMMARY

In summary, one aspect provides a method comprising: receiving, at a device, input; processing, using a processor, the input to identify at least one user command; identifying, using a processor, a characteristic related to the at least one user command; and performing an action based on the at least one command and the characteristic.

Another aspect provides an information handling device, comprising: a processor; an input device; a memory device that stores instructions executable by the processor to: receive, at the input device, input; process, using a processor, the input to identify at least one user command; identify, using a processor, a characteristic related to the at least one user command; and perform an action based on the at least one command and the characteristic.

A further aspect provides a product, comprising: a storage device having code stored therewith, the code being executable by a processor and comprising: code that receives, at a device, input; code that processes the input to identify at least one user command; code that identifies a characteristic related to the at least one user command; and code that performs an action based on the at least one command and the characteristic.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
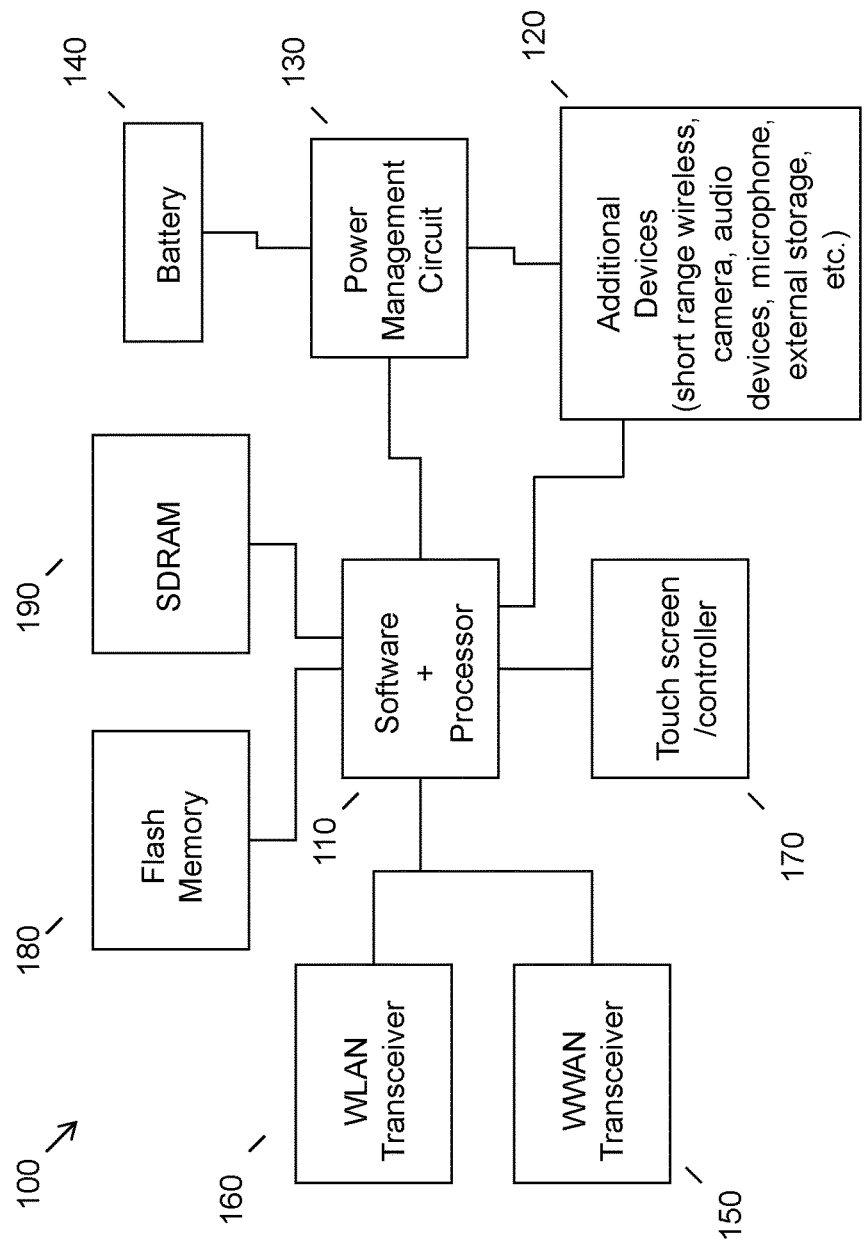
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Part of the reason voice activated devices are so beneficial is also one of their major drawbacks. Voice controlled devices are helpful because they are intuitive and easy to use. However, part of what makes voice activated devices so easy to use is their universal nature. Many intelligent personal assistants are designed to be multi-user; for example, a single assistant may serve an entire family or office. This multi-user interface, although convenient, can lead to issues regarding user preference. This is because different people may have different preferences, and these preferences may end up being reset or altered by any additional users utilizing the device in the interim.

For example, a user's significant other may request the device to play a particular rock music group, and subsequently adjust the volume up. Then, when the original user returns to the device later in the day and issues a command to play classical music, the volume may be too loud. Therefore, a solution is needed that allows a device to identify some context around the voice request and then modify the voice request based on this context. Currently, in order for a device to manage multiple users or multiple user profiles, the device must utilize some kind of login or credentialing system. This technical issue presents a problem when using a voice activated device.

An embodiment identifies a user, or set of users, and customizes the actions taken based on the specific users issuing the commands. In an embodiment, a device may record and consider historical user data. Based on the historical data, an embodiment may learn and thus anticipate what settings or command modifications should be applied to the requested task. Alternatively, or in addition, an embodiment may detect environmental factors and modify the user's command(s) based on the detected environmental factors.

Thus, an embodiment is much more convenient in many scenarios, e.g., households, offices, etc. Allowing users to maintain a profile like identify regarding a device ensures the most personalized interaction with the device. This type of customization is extremely beneficial with using a device such as a digital personal assistant. The result is that the device makes the correct decisions for each user rather than using a default setting or the last used condition.

Accordingly, an embodiment provides a method for receiving, at a device, input. The input may be user input in the form of voice input, tactile input, or any known method of device input. Once the input is received, an embodiment parses the input in order to identify at least one user command (e.g., requesting an Internet query). An embodiment also monitors various factors in order to detect a modifying characteristic. This characteristic may be associated with the user (e.g., a voice profile) or non-user based (e.g., environmental noise). Once an embodiment determines if a characteristic is present, it may modify the command based on the characteristic. The device may then carry out a task based on the newly modified command.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio capture device such as a microphone. System 100 often includes a touch screen 170 for data input and display/rendering. System 100 also typically includes various memory devices, for example flash memory 180 and SDRAM 190.

Figure 2:
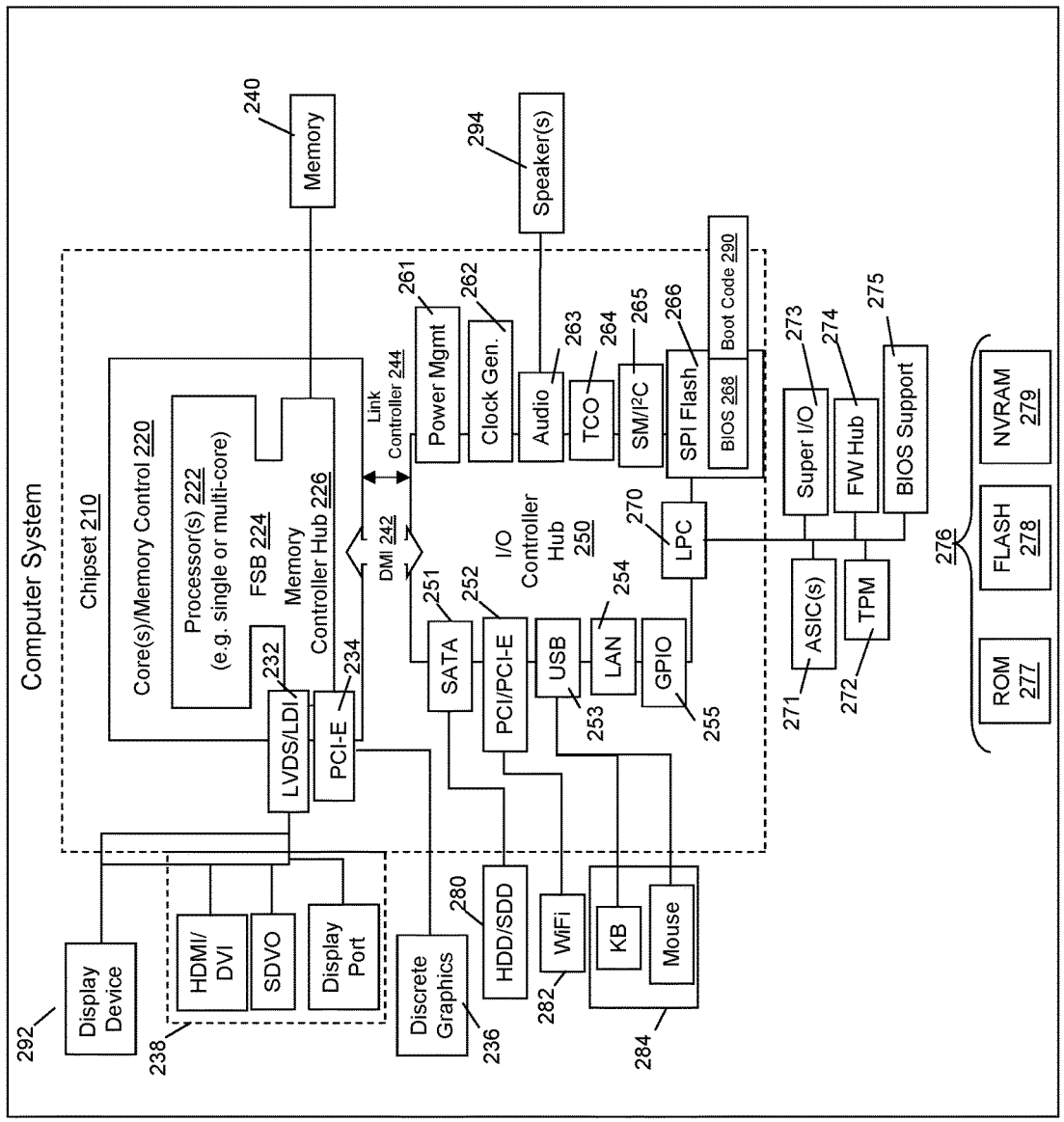
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices that users may utilize as an intelligent personal assistant to perform various tasks or solve various problems. For example, the circuitry outlined in FIG. 1 may be implemented in a tablet or smart phone embodiment, whereas the circuitry outlined in FIG. 2 may be implemented in a personal computer embodiment.

Figure 3:
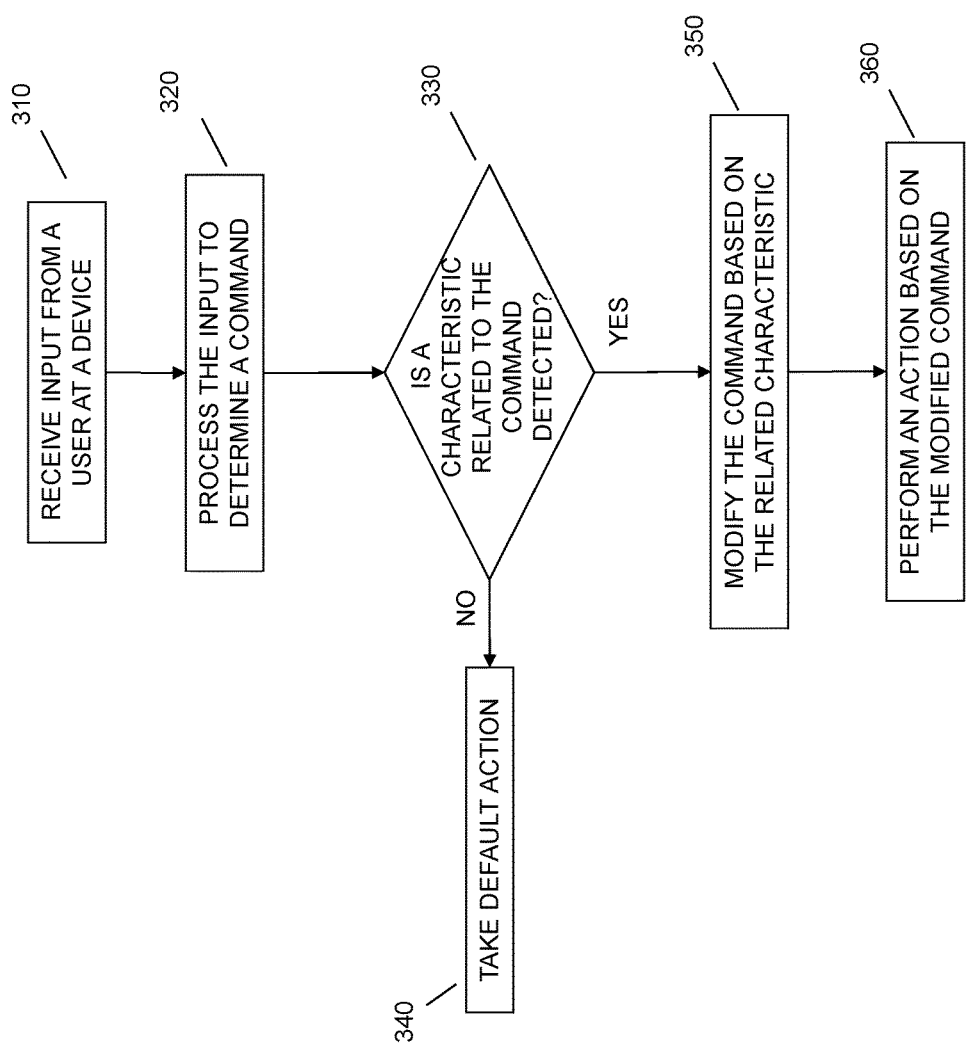
FIG. 3 illustrates an example method of modifying input based on a determined characteristic.

Referring now to FIG. 3, an embodiment may receive input from a user at 310. This input may be received via a variety of input device (e.g., physical keyboard, on-screen keyboard, audio capture device, image capture device, video capture device, etc.) The input received at 310, may be any known method of input to an electronic device (e.g., audio, tactile, biometric, visual, etc.). For simplicity purposes, the majority of the discussion herein will involve an audio input device, and voice input. However, it should be understood that generally any form of user input may be utilized.

Once the input is received at 310, an embodiment may analyze that input at 320 to determine if the input included a command (e.g., a user request or demand relating to an action to be carried out by the device.). In addition to identifying a command at 320, an embodiment analyzes the input to determine if a characteristic related to the command exists at 330. The characteristic may be based on various factors, including factors received within the input and factors determined independent of the input. Examples of possible characteristics are discussed at length herein.

If a characteristic related to the command is identified, as illustrated at 330, an embodiment may modify the command, as illustrated at 350. The relation between the command and the characteristic may be based on a variety of factors such as user preference, external factors, environmental factors, etc. If no characteristic is detected, or if the characteristic is not related to the command, an embodiment will take a default action at 340. Thus, if no modifying characteristic is detected, an embodiment may simply carry out the command exactly as received from a user. For example, if a user requests an embodiment to play some form of media (e.g., "play music," "turn on the TV," etc.), and no related characteristic is detected, the embodiment will simply play the requested media with no adjustments or modifications.

Alternatively, if it is determined that a characteristic related to the command is detected at 330, the command may be modified based on the related characteristic at 350. For example, an embodiment may store a preference indicating that a particular user has a preference for listening to music at a certain volume level. An embodiment may also store a preference indicating that a previous user has set the volume to at a much higher level than a current setting. Thus, although a user only issues a single command such as "play music," (i.e., without a volume control command), an embodiment may nonetheless modify the command, e.g., to include additional command(s) such as adjust the volume to level 4, as per this example. This ensures that the current user's main request is processed and improved based on a previously known user preference. Once the command is modified, an embodiment may perform an action based on the modified command at 360.

The characteristics which may be considered related to the received command at 330 may broad in scope. An embodiment may consider a factor such as time of day to be a modifying characteristic. For example, if a user enters a request or command to "play music," an embodiment may, based on the time of day, modify the volume level of the music prior to playing. By way of further example, if the "play music" request is received at 11:00 am, an embodiment may determine, based on stored data, that the user is in a work environment and thus play a particular type of music (e.g., classical) at a particular volume (e.g., low). Alternatively, if an embodiment determines that the user is a home (e.g., due to the fact that the input is received at 7:00 pm), the music selected may be different (e.g., pop music) and the volume may also be adjusted accordingly (e.g., louder).

Additionally or alternatively, an embodiment may consider location as a modifying characteristic. Thus, similar to the above example, if a user requests a device to "play music" and the device can determine the general location (e.g., home, work, etc.), and adjust the type of music and volume of the music accordingly. Additionally, if the user enters a request such as a search query, which may be affected based on the user's location, an embodiment may adjust the request (e.g., update the search query) based on the known location. For example, if the user issues a command such as "order pizza" an embodiment may identify the user's location, and present the user with all of the available options for pizza deliver within a predetermined radius of the device.

Additionally, a further embodiment may determine that an environmental factor is a modifying characteristic. For example, an embodiment may detect ambient noise when receiving the user input (e.g., voice input), and thus modify the user's command based on the noise. For example, if a user is in a noisy environment, (e.g., raining, other media such as a TV playing, children in the house, etc.) and issues the command "play music," an embodiment may automatically modify the user request and set the volume level higher than normal (e.g., a default or previously used value) to compensate for the noisy environment.

In addition to external factors (e.g., time, location, environment, etc.) an embodiment may consider characteristics contained within the user input. For example, an embodiment may analyze a user's voice input and based on various characteristics of the voice input identify a voice signature. This analysis may be performed using a variety of methods (e.g., frequency estimation, hidden Markov models, Gaussian mixture models, pattern matching, neural networks, matrix representation, decision trees, etc.). An embodiment may identify a user based on a voice signature and adjust the command accordingly. For example, if another user changed a system setting (e.g., volume, search engine, etc.) recently, an embodiment may return the system setting to the current user's preferred setting prior to performing the action based on the user command.

An embodiment may utilize a characteristic detected prior to receipt of the user input. For example, an embodiment may identify a user based on ambient audio data, (e.g., a user speaking but not issuing a command), and thus identify the user based on his or her voice signature. This way, an embodiment may prime the system to modify any subsequent command (e.g., received within a predetermined time) based on the characteristic detected.

In an embodiment, user specific data, for example user input, is stored and used for future identification needs. The user specific data is added to a compilation of historical user data, which may be associated with a particular user or various users. For example, samples of a user's voice input may be analyzed as discussed herein to create a voice signature. This voice signature is then stored as historical information relating to a particular user. Thus, when that same user attempts to enter voice input to a device, the historical information may be referenced and the user identified.

Additionally, an embodiment may use this historical data to store preferences associated with a particular user. These preferences may be identified as modifying characteristics, and thus an embodiment is enabled to modify a user command based on previously identified user preferences. For example, if a user regularly submits additional or follow commands with a specific command, an embodiment may learn specific user patterns based on the historical data (e.g., previous user requests to set the volume level) and modify the user's commands to include those additional commands.

The historical user data used to identify users and user's preferences may be stored locally and/or remotely. An embodiment may store this historical data locally (e.g., using an HDD/SDD as shown in FIG. 2 at 280) so that the standalone device can still identify characteristics at 330 without a network connection. However, the volume of historical user data may be extremely large, e.g., if the device is utilized by a large number of users. Thus, an embodiment may also store the historical user data remotely in a network connected device. In addition to storing the data remotely, an embodiment may make determinations remotely, e.g., the detection illustrated at 330. This allows the user device to remain small and consume fewer resources or processing. For example, small form factors such as a smart watch may be used.

Accordingly, as illustrated by the example embodiments of the figures, an embodiment provides a method of receiving input (e.g., voice, tactile, etc.) from a user at a device. Once the input is received, an embodiment processes the input and identifies a desired user command within the input. An embodiment then determines if a characteristic exists that is related to the command (e.g., a modifying characteristic). If no characteristic exits, an embodiment executes the identified command in a default or last used manner. Alternatively, if a characteristic is detected (e.g., a voice signature, environmental sound, etc.) an embodiment may modify the received command based on the characteristic. Once the command is modified, an embodiment takes an action based on the modified command.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
  receiving, at a digital assistant device, input from a user comprising at least one user command for performing an action at the digital assistant device;
  identifying the user providing the input;
  determining a characteristic to modify the command, wherein the characteristic is related to the at least one user command and is identified from at least one factor external to the digital assistant device, wherein the determining comprises determining the characteristics from a specific user pattern of the user related to the at least one factor, the specific user pattern being identified from historical data that identifies characteristics selected by the user upon previous provisions of the command when at least one external factor was similar to the at least one factor, wherein the determination of the characteristic is made independent of the received input wherein the determining is based at least in part upon a predetermined radius of the device;

implementing a preference of the identified user with respect to performance of the command, wherein the preference is based upon both the identified user, the specific user pattern, and the determined characteristic and wherein preferences of a user with respect to performance of the command are different with different determined characteristics, wherein the preference is not identified within the at least one user command and is determined from the characteristic; and performing, by the digital assistant device, a modified action, wherein the modified action comprises the action modified based on the implemented preference.

2. The method of claim 1, further comprising: detecting, based on voice input, a voice signature associated with a particular user, wherein the characteristic is based on the particular user.

3. The method of claim 1, wherein the characteristic is based on historical user data.

4. The method of claim 3, wherein the historical user input comprises at least one previously entered command, and
wherein the performing comprises performing an action based on the previously entered command.

5. The method of claim 3, wherein the historical user data is stored in a location selected from the group consisting of: locally and remotely.

6. The method of claim 1, further comprising modifying, based on the characteristic, the at least one user command;
wherein the at least one modified command comprises the at least one user command and at least one additional voice command added to the at least one user command.

7. The method of claim 1, wherein the characteristic is based on a time of day.

8. The method of claim 1, wherein the characteristic is based on environmental factors.

9. The method of claim 1, wherein the characteristic is based on location.

10. The method of claim 1, wherein the action comprises playing an audio media and wherein the preference comprises a volume preference for the playing of the audio media.

11. An information handling device, comprising:
a processor;
an input device;
a memory device that stores instructions executable by the processor to:
receive, at the input device, input from a user comprising at least one user command for performing an action at the information handling device, wherein the information handling device comprises a digital assistant;
identify the user providing the input;
determine a characteristic to modify the command, wherein the characteristic is related to the at least one user command and is identified from at least one factor external to the digital assistant device, wherein the determining comprises determining the characteristics from a specific user pattern of the user related to the at least one factor, the specific user pattern being identified from historical data that identifies characteristics selected by the user upon previous provisions of the command when at least one external factor was similar to the at least one factor, wherein the determination of the characteristic is made independent of the received input wherein the determining is based at least in part upon a predetermined radius of the device;
implement a preference of the identified user with respect to performance of the command, wherein the preference is based upon both the identified user, the specific user pattern, and the determined characteristic and wherein preferences of a user with respect to performance of the command are different with different determined characteristics, wherein the preference is not identified within the at least one user command and is determined from the characteristic; and
perform, by the information handling device, a modified action, wherein the modified action comprises the action modified based on the implemented preference.

12. The information handling device of claim 11, wherein the input is voice input.

13. The information handling device of claim 12, further comprising: detecting, based on the voice input, a voice signature associated with a particular user, wherein the characteristic is based on the particular user.

14. The information handling device of claim 11, wherein the characteristic is based on historical user data.

15. The information handling device of claim 14, wherein the historical user input comprises at least one previously entered command, and
wherein the performing comprises performing an action based on the previously entered command.

16. The information handling device of claim 11, further comprising modifying, based on the characteristic, the at least one user command;
wherein the at least one modified command comprises the at least one user command and at least one additional voice command added to the at least one user command.

17. The information handling device of claim 11, wherein the characteristic is based on a time of day.

18. The information handling device of claim 11, wherein the characteristic is based on environmental factors.

19. The information handling device of claim 11, wherein the characteristic is based on location.

20. A product, comprising:
a storage device having code stored therewith, the code being executable by a processor and comprising:
code that receives, at a digital assistant device, input from a user comprising at least one user command for performing an action at the digital assistant device;
code that identifies the user providing the input;
code that determines a characteristic to modify the command, wherein the characteristic is related to the at least one user command and is identified from at least one factor external to the digital assistant device, wherein the determining comprises determining the characteristics from a specific user pattern of the user related to the at least one factor, the specific user pattern being identified from historical data that identifies characteristics selected by the user upon previous provisions of the command when at least one external factor was similar to the at least one factor, wherein the determination of the characteristic is made independent of the received input wherein the determining is based at least in part upon a predetermined radius of the device;
code that implements a preference of the identified user with respect to performance of the command, wherein the preference is based upon both the identified user, the specific user pattern, and the determined characteristic and wherein preferences of a user with respect to performance of the command are different with different determined characteristics, wherein the preference is not identified within the at least one user command and is determined from the characteristic; and code that performs, by the digital assistant device, a modified action, wherein the modified action comprises the action modified based on the implemented preference.

* * * * *